(12) United States Patent
Sasaki

(10) Patent No.: US 7,403,342 B2
(45) Date of Patent: Jul. 22, 2008

(54) LENS DEVICE

(75) Inventor: Ryota Sasaki, Saitama (JP)

(73) Assignee: Fujinon Corporation, Saitama-Shi, Saitama (JP)

( * ) Notice: Subject to any disclaimer, the term of this patent is extended or adjusted under 35 U.S.C. 154(b) by 0 days.

(21) Appl. No.: 11/584,581

(22) Filed: Oct. 23, 2006

(65) Prior Publication Data

US 2007/0091462 A1  Apr. 26, 2007

(30) Foreign Application Priority Data

Oct. 24, 2005  (JP)  ............................ P2005-308897

(51) Int. Cl.
*G02B 15/14* (2006.01)
(52) U.S. Cl. .................................... 359/694
(58) Field of Classification Search ........................ None
See application file for complete search history.

(56) References Cited

U.S. PATENT DOCUMENTS 3,930,721 A * 1/1976 Caraway ..................... 359/227
5,150,260 A    9/1992 Chigira
5,576,894 A *  11/1996 Kuwana et al. ............. 359/701
2003/0184877 A1* 10/2003 Kabe ........................... 359/694
2004/0012304 A1  1/2004 Yoshida et al.

FOREIGN PATENT DOCUMENTS

| EP | 0464764 | * | 1/1992 |
| EP | 0464764 A1 | | 1/1992 |
| EP | 0564352 A1 | | 10/1993 |
| EP | 1605290 A2 | | 12/2005 |
| EP | 1605529 A1 | | 12/2005 |
| JP | 2633066 B2 | | 4/1997 |
| JP | 3170999 B2 | | 3/2001 |

* cited by examiner

*Primary Examiner*—Sung Pak
*Assistant Examiner*—Chad H Smith
(74) *Attorney, Agent, or Firm*—Birch, Stewart, Kolasch & Birch, LLP

(57) ABSTRACT

A lens device comprises: at least one driven member including an optical system and a lens frame holding the optical system; a plurality of guides that guide the driven member in a direction of an optical axis; a driving frictional member frictionally engaged with the driven member; and an electromechanical conversion member connected to the driving frictional member.

9 Claims, 8 Drawing Sheets

LENS DEVICE

BACKGROUND OF THE INVENTION

1. Field of the Invention

The present invention relates to a lens device and, more particularly, to a lens device mounted on a miniature precision apparatus, such as a digital camera and a portable telephone.

2. Description of the Related Art

There is an actuator that uses a piezoelectric element and that serves as a drive device of a lens part of a digital camera or the like. For example, a drive device disclosed in Japanese Patent No. 2633066 is configured so that a driving shaft is fixed to one side of the piezoelectric element and that the other side of the piezoelectric element is fixed to a device body. A lens-barrel is slidably supported by the driving shaft. The lens-barrel is frictionally engaged with the driving shaft by utilizing a pushing force of a leaf spring. A driving pulse having a substantially sawtooth-like waveform is applied to the piezoelectric element. The piezoelectric element deforms in an expanding direction and in a contracting direction at different speeds. For example, in a case where the piezoelectric element gradually deforms, the lens-barrel moves together with the driving shaft. Conversely, in a case where the piezoelectric element deforms fast, the lens-barrel remains at the same position by the inertia of the mass thereof. Thus, the lens-barrel can intermittently be moved at a fine pitch by iteratively applying the driving pulse having the substantially sawtooth-like waveform to the piezoelectric element.

The drive device disclosed in Japanese Patent No. 2633066 is configured so that the driving shaft is directly fitted into the lens-barrel. Consequently, the replacement of a component of the drive device cannot be achieved unless the drive device is completely disassembled. Thus, an actuator disclosed in Japanese Patent No. 3170999 is configured so that a slider is frictionally engaged with a driving shaft, and that a lens-barrel is fixed to this slider. Therefore, the lens-barrel and the actuator can be disengaged from each other. The replacement of a component can easily be achieved.

Meanwhile, each of the related drive devices respectively disclosed in Japanese Patent No. 2633066 and Japanese Patent No. 3170999 is configured so that the entire load due to the lens-barrel is applied to the driving shaft of the actuator. For example, the drive device disclosed in Japanese Patent No. 3170999 is adapted so that the load due to the lens-barrel is supported only by the driving shaft. Also, the drive device disclosed in Japanese Patent No. 2633066 is adapted so that although the lens-barrel is engaged with a guide bar to prevent the lens-barrel from turning, the load due to the lens-barrel is received by the driving shaft. Accordingly, there is a fear that when each of the drive devices respectively disclosed in Japanese Patent No. 2633066 and Japanese Patent No. 3170999 suffers an impact due to the dropping thereof, a large load may be applied to the driving shaft to thereby damage or distort the driving shaft. To solve this problem, it is necessary to thicken the driving shaft to increase the stiffness thereof. However, in a case where the driving shaft is thickened, the piezoelectric element is slow to react. Thus, the related drive devices have problems that the lens-barrel cannot be moved with high precision, and that the size of the device is increased.

SUMMARY OF THE INVENTION

The invention is accomplished in view of such circumstances. An object of the invention is to provide a lens device enabled to prevent the driving shaft of an actuator from being damaged, and also enabled to move a driven member with high precision.

To achieve the foregoing object, according to a first aspect of the invention, there is provided a lens device comprising: at least one driven member including an optical system and a lens frame holding the optical system; a plurality of guides that guide the driven member in a direction of an optical axis; a driving frictional member frictionally engaged with the driven member; and an electro-mechanical conversion member (a piezoelectric element) connected to the driving frictional member.

According to the invention, the lens device is provided with the plurality of guides differing from the driving frictional member to guide the driven member in the direction of an optical axis. Thus, the entire load due to the driven member is not applied to the driving frictional member. Therefore, the driving frictional member can be prevented from receiving a large load and being damaged when the driving frictional member suffers an impact caused by being dropped.

According to a second aspect of the invention, there is provided the lens device set forth in the first aspect of the invention, wherein the driven member comprises a connection member frictionally engaged with the driving frictional member; and the connection member is connected to the lens frame through an elastic element.

In the lens device according to the invention, the connection member frictionally engaged with the driving frictional member is a separate member from the lens frame. Additionally, the connection member and the lens frame are connected by the pushing force of the elastic element. Thus, when the device receives an impact due to the dropping thereof, the impact can be absorbed by the elastic element. Consequently, the load due to the lens frame can be prevented from being imposed on the driving frictional member. Also, the driving frictional member can be prevented from being damaged. Additionally, occurrences of the displacement and the inclination thereof due to a posture difference can be prevented.

According to a third aspect of the invention, there is provided the lens device set forth in the first or second aspect of the invention, wherein said at least one driven member comprises a plurality of driven members, and said plurality of the driven members are guided by a common guide. Thus, according to the lens device, the lens device can be miniaturized.

BRIEF DESCRIPTION OF THE DRAWINGS

FIG. 3 is a perspective view illustrating the lens device, which is taken from a direction different from a direction in which FIG. 2 is taken;

DETAILED DESCRIPTION OF THE INVENTION

Hereinafter, a preferred embodiment of a lens device according to the invention is described in detail with reference to the accompanying drawings.

Figure 1:
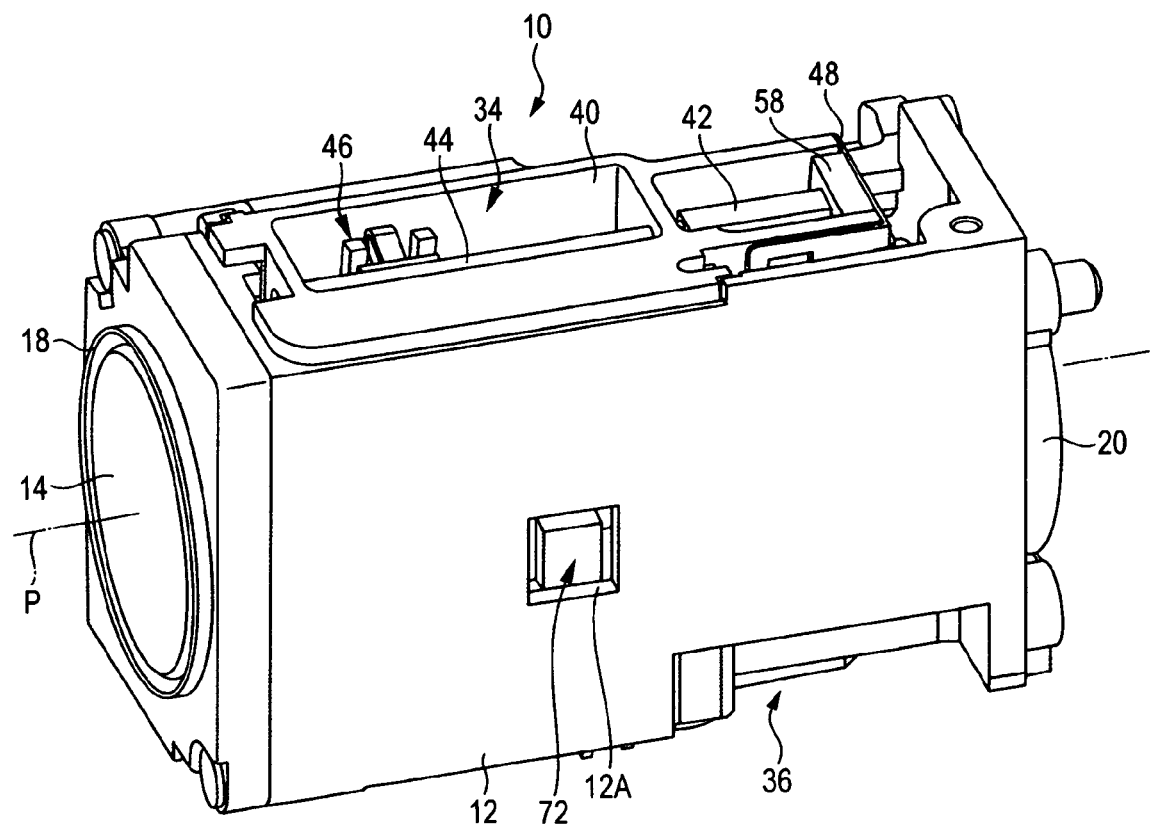
FIG. 1 is a perspective view illustrating a lens device to which an actuator according to the invention is applied.
Figure 2:
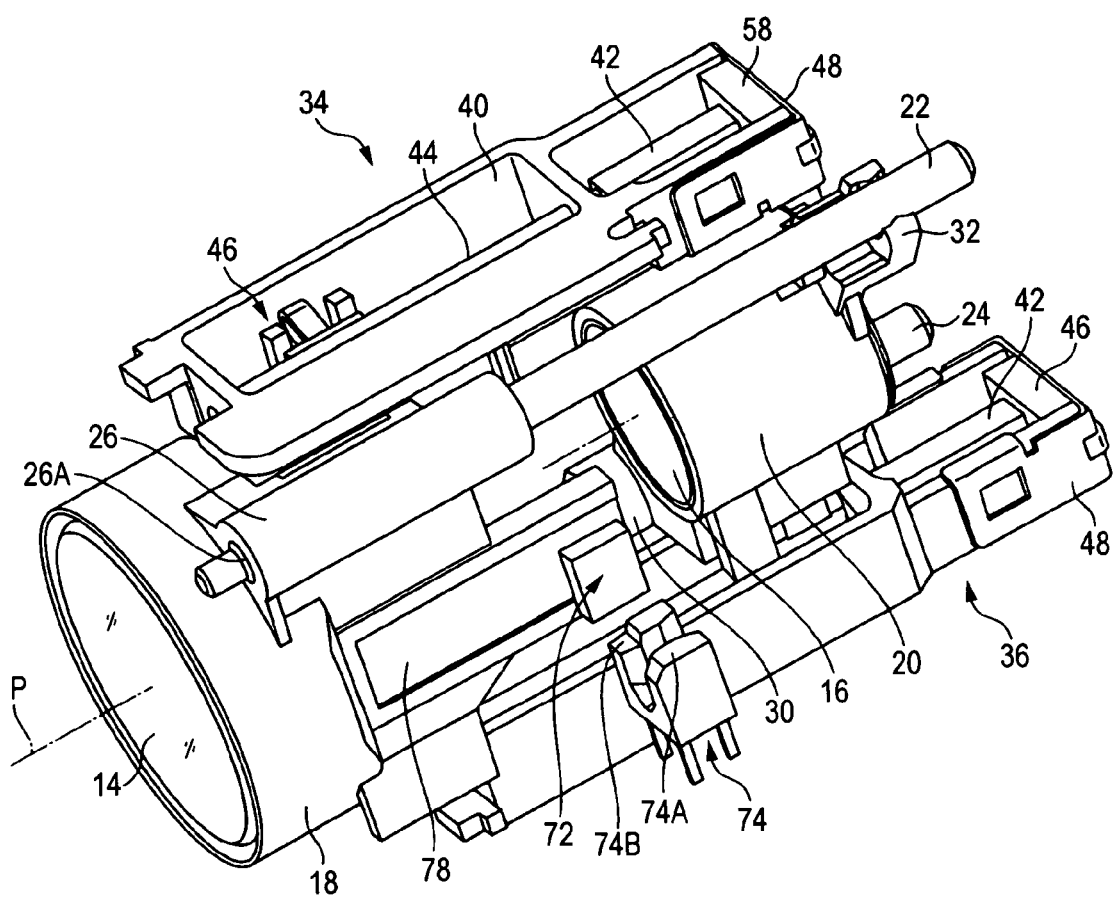
FIG. 2 is a perspective view illustrating an internal construction of the lens device shown in FIG. 1.
Figure 3:
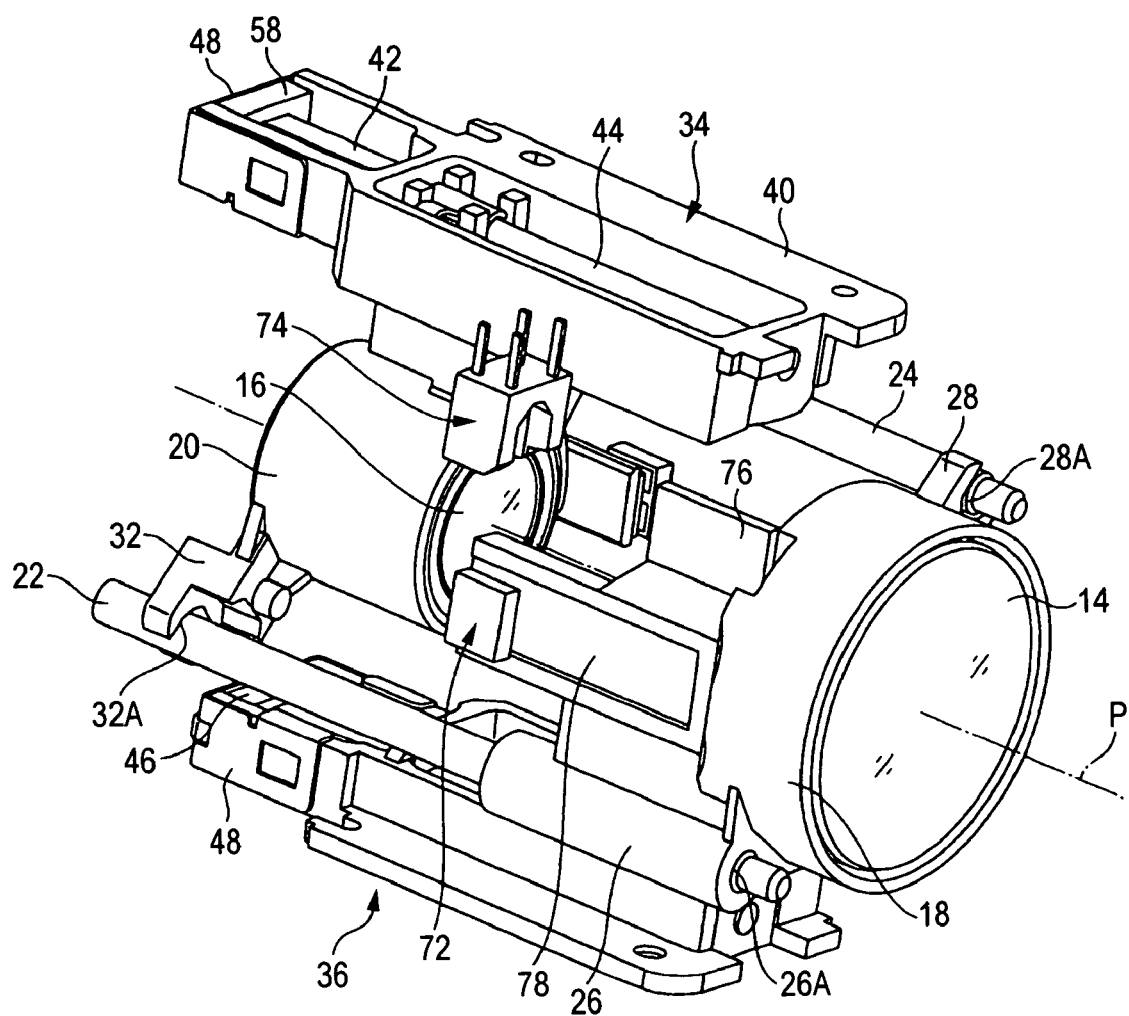

FIG. 1 is a perspective view illustrating a lens device 10 according to the invention. FIGS. 2 and 3 are perspective views illustrating an internal construction thereof.

As shown in FIG. 1, the lens device 10 has a body 12 formed into substantially rectangular shape. Zoom lenses (or zoom lens groups) 14 and 16 shown in FIGS. 2 and 3 are provided in the body 12. One of the zoom lenses (or zoom lens groups) 14 and 16 is a variable power lens (or variable power lens group). The other zoom lens (or zoom lens group) is a correction lens. Incidentally, one of the zoom lenses (or zoom lens groups) 14 and 16 may be a focusing lens.

The zoom lenses (or zoom lens groups) 14 and 16 are held by holding frames 18 and 20, respectively. Each of the holding frames 18 and 20 is supported by two guide shafts 22 and 24 to be slidable in the direction of an optical axis P. The two guide shafts 22 and 24 are disposed in the body 12 to be placed at diagonal positions in a transversal cross-section and to extend in parallel to the optical axis P, and are fixed to the body 12.

The holding frame 18 has a guide portion 26 provided with an insertion hole 26A, through which the guide shaft 22 is inserted, and also has an engagement portion 28 provided with a U-shaped groove 28A with which the guide shaft 24 is engaged. Therefore, the holding frame 18 is guided in the direction of the optical axis P by employing the guide shaft 22 as a main guide means. Also, the holding frame 18 is prevented by employing the guide shaft 24 as an auxiliary guide means from turning around the optical axis P. Consequently, the holding frame 18 is guided by the two guide shafts 22 and 24, so that the zoom lens (or zoom lens group) 14 is supported to be movable in the direction of the optical axis P.

Similarly, the holding frame 20 for the zoom lens 16 has a guide portion 30 provided with an insertion hole (not shown), through which the guide shaft 24 is inserted, and also has an engagement portion 32 provided with a U-shaped groove 32A with which the guide shaft 22 is engaged. Thus, the holding frame 20 is guided in the direction of the optical axis P by employing the guide shaft 24 as a main guide means. Also, the holding frame 20 is prevented by employing the guide shaft 22 as an auxiliary guide means from turning around the optical axis P. Consequently, the holding frame 20 is guided by the two guide shafts 22 and 24, so that the zoom lens (or zoom lens group) 16 is supported to be movable in the direction of the optical axis P.

The zoom lenses (or zoom lens groups) 14 and 16 are driven by actuators 34 and 36 in the direction of the optical axis P. The actuators 34 and 36 are placed on opposite sides of the body 12, respectively. More specifically, the actuator 34 for the zoom lens (group) 14 is disposed on the top surface of the body 12, as viewed in FIG. 1. The actuator 36 for the zoom lens (group) 16 is disposed on the bottom surface of the body 12.

Incidentally, reference numerals 72 and 74 shown in FIGS. 1 to 3 designate position detection devices. The position detection device 72 is a reflection type photoreflector disposed to face a plate-like reflection portion 78 formed integrally with the holding frame 18 (or 20). The position detection device 72 is fixed to the body 12 (see FIG. 1) by being fitted into an aperture portion 12A of the body 12. A plurality of reflection elements (not shown) is disposed at uniform intervals in a driving direction on the reflection portion 78. Thus, light is projected from the position detection device 72 onto the reflection portion 78. Subsequently, the position detection device 72 receives reflection light and detects change in an amount of light, so that an amount of displacement of the reflection portion 78 (that is, the holding frames 18 and 20) can be detected. Meanwhile, the position detection device 74 has a light projecting portion 74A and a light receiving portion 74B. A plate-like light shielding portion 76 formed integrally with the holding portion 18 (or 20) is inserted into or is pulled from between the light projecting portion 74A and the light receiving portion 74B. Thus, the amount of light is changed by inserting the light shielding portion 76 into between the light projecting portion 74A and the light receiving portion 74B. Consequently, the position detection device 74 can detect that the light shielding portion 76 (that is, the holding frames 18 and 20) has moved to a predetermined position. Thus, the reference positions of the holding frames 18 and 20 are detected by the position detection device 74. The amount of displacement of each of the holding frames 18 and 20 is detected by the position detection device 72. Consequently, the positions of the holding frames 18 and 20 can accurately be obtained. The actuators 34 and 36 are drive-controlled according to values measured by the position detection devices 72 and 74.

Subsequently, the configuration of the actuator 34 is described below. Incidentally, the actuator 36 is configured similarly to the actuator 34. Thus, the description of the configuration of the actuator 36 is omitted.

Figure 4:
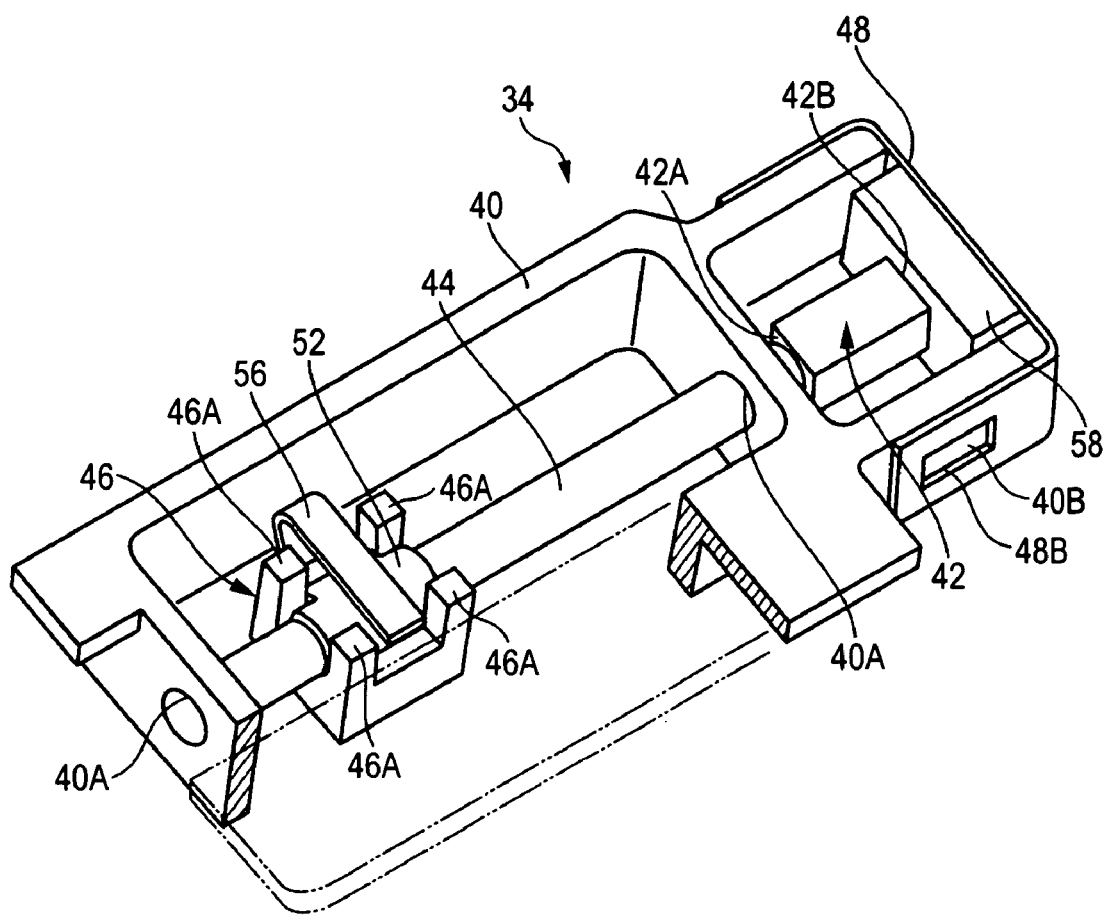
FIG. 4 is a view schematically illustrating a configuration of an actuator according to a first embodiment.

FIG. 4 is a view schematically illustrating a configuration of the actuator 34. As shown in FIG. 4, the actuator 34 mainly includes a fixed frame 40, a piezoelectric element (corresponding to the electro-mechanical conversion element) 42, and a driving shaft 44. The fixed frame 40 is fixed to the body 12 of the lens device 10 shown in FIG. 1.

The piezoelectric element 42 is stacked in the direction of the optical axis P (hereunder referred to as a driving direction) of the lens device 10. The piezoelectric element 42 is configured to be deformed (that is, expanded and contracted) by applying a voltage thereto. Therefore, the end surfaces 42A and 42B in the longitudinal direction of the piezoelectric element 42 are displaced in the driving direction by applying the voltage thereto.

A weight member 58 made of a soft material is bonded and fixed to one 42B of end surfaces 42A and 42B of the piezoelectric element 42. The weight member 58 applies a load to the end surface 42B to thereby prevent the displacement of the end surface 42B from being larger than that of the end surface 42A. Accordingly, preferably, the weight of the weight member is larger than that of the driving shaft 44. Also, the soft material, whose Young's modulus is smaller than the materials of the piezoelectric element 42 and the driving shaft 44 and is equal or less than, for example, 300 MPa, is used as the material of the weight member 58. The weight member 58 is made of, for example, urethane rubber or a urethane resin and is manufactured by mixing metal powder, such as tungsten powder, into the urethane rubber or resin to increase the specific gravity thereof. It is preferable for miniaturization that the specific gravity of the weight member 58 is high as much as possible. The specific gravity of the weight member 58 is set at, for example, about 8 to 12.

The weight member 58 is bonded to a metal mounting fitting 48 at a side opposite to the piezoelectric element 42. The mounting fitting 48 is formed like a letter "U" by bending a thin metal plate. An aperture portion 48B is formed in a bending part at each of both end portions of the fitting 48. The mounting fitting 48 is mounted on a fixed frame 40 by fitting the aperture portion 48B onto a projection portion 40B of the fixed frame 40. Consequently, the piezoelectric element 42 is supported by the fixed frame 40 through the weight member 58 and the mounting fitting 48.

Meanwhile, the base of the driving shaft 44 is fixed to the end surface 42A of the piezoelectric element 42. The driving shaft 44 is formed like a cylindrical column and is disposed so that the central axis thereof extends in the driving direction. The driving shaft 44 is guided by being inserted through two holes 40A, 40A formed in the fixed frame 40. The driving shaft 44 is supported to be slidable in the direction of the central axis thereof. A graphite crystal-complex obtained by strongly complexing graphite crystals, for example, carbon graphite is used as the material of the driving shaft 44.

A connection piece (corresponding to the connection member) 46 is engaged with the driving shaft 44. The connection piece 46 is engaged with the holding frame 18, as will be described later. The driven member includes the connection piece 46, the holding frame 18, and the zoom lenses (or zoom lens groups).

The connection piece 46 is formed substantially like a rectangular parallelepiped. Projection portions 46A, . . . , and 46A upwardly projected are provided at four corner portions of the connection piece 44, respectively. The driving shaft 44 is disposed to pass through among the projection portions 46A . . . , and 46A and is engaged with the connection piece 46.

Figure 5:
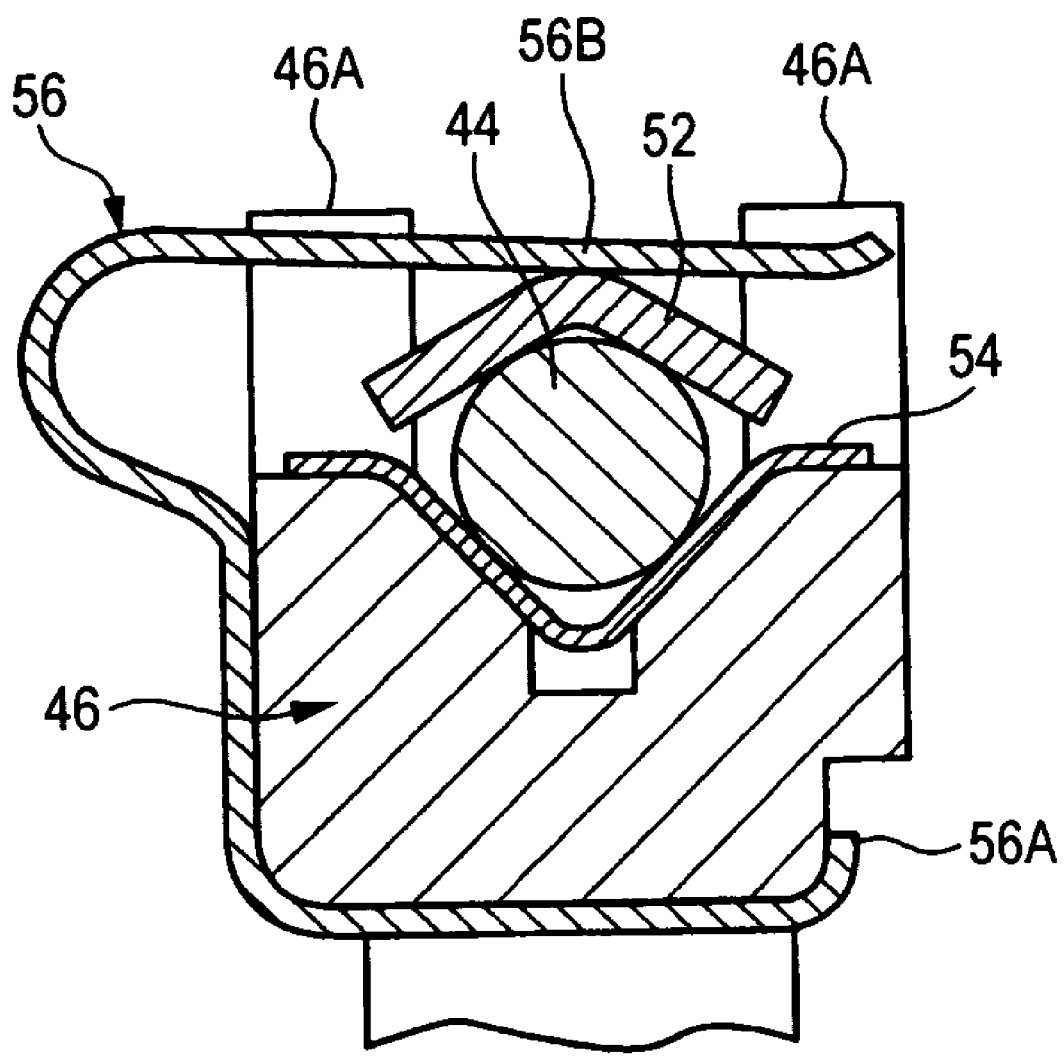
FIG. 5 is a cross-sectional view illustrating a connection part between a driving shaft and a connection piece.

FIG. 5 is a cross-sectional view illustrating the engagement portion between the connection piece 46 and the driving shaft 44. As shown in this figure, a first sliding member 52 and a second sliding member 54 are provided at the engagement portion between the connection piece 46 and the driving shaft 44. The first sliding member 52 is disposed on the top side of the driving shaft 44. The second sliding member 54 is disposed on the bottom side of the driving shaft 44. The first sliding member 52 and the second sliding member 54 are provided to stably obtain a frictional force acting between the connection piece 46 and the driving shaft 44, and are made of, for example, stainless steel.

The second sliding member 54 is formed by being cross-sectionally V-shaped, and is fixed to the connection piece 46. On the other hand, the first sliding member 52 is formed by being cross-sectionally inverted-V-shaped, and is disposed in a region surrounded by the four projection portions 46A, . . . , and 46A of the connection piece 46. The first sliding member 52 is notched at each corner portion thereof aligned with an associated one of the projection portions 46A, . . . , and 46A of the connection piece 46. Consequently, the first sliding member 52 is prevented from slipping off the connection piece 46 when the first sliding member 52 is placed in the region surrounded by the projections 46A . . . , and 46A.

A pressing spring 56 is mounted on the connection piece 46 by hooking a claw 56a to a lower part of the connection piece 46. The pressing spring 56 is constructed by bending a metal plate. The pressing spring 56 has a pressing portion 56B disposed on the top side of the first sliding member 52, and is configured to downwardly push the first sliding member 52 by the pressing portion 56B. Consequently, the driving shaft 44 is clamped between the first sliding member 52 and the second sliding member 54, so that the connection piece 46 is frictional-engaged with the driving shaft 44 through the first sliding member 52 and the second sliding member 54. Incidentally, the frictional force acting between the connection piece 46 and the driving shaft 44 is set so that when a driving pulse representing a slowly changed voltage is applied to the piezoelectric element 42, the frictional force is larger in magnitude than a driving force, and that when a driving pulse representing a drastically changed voltage is applied to the piezoelectric element 42, the frictional force is smaller in magnitude than a driving force. At that time, preferably, the frictional force (or sliding-resistance) is equal to or larger than 10 gf and is equal to or smaller than 30 gf. More preferably, the frictional force is equal to or larger than 15 gf and is equal to or smaller than 25 gf.

Figure 6:
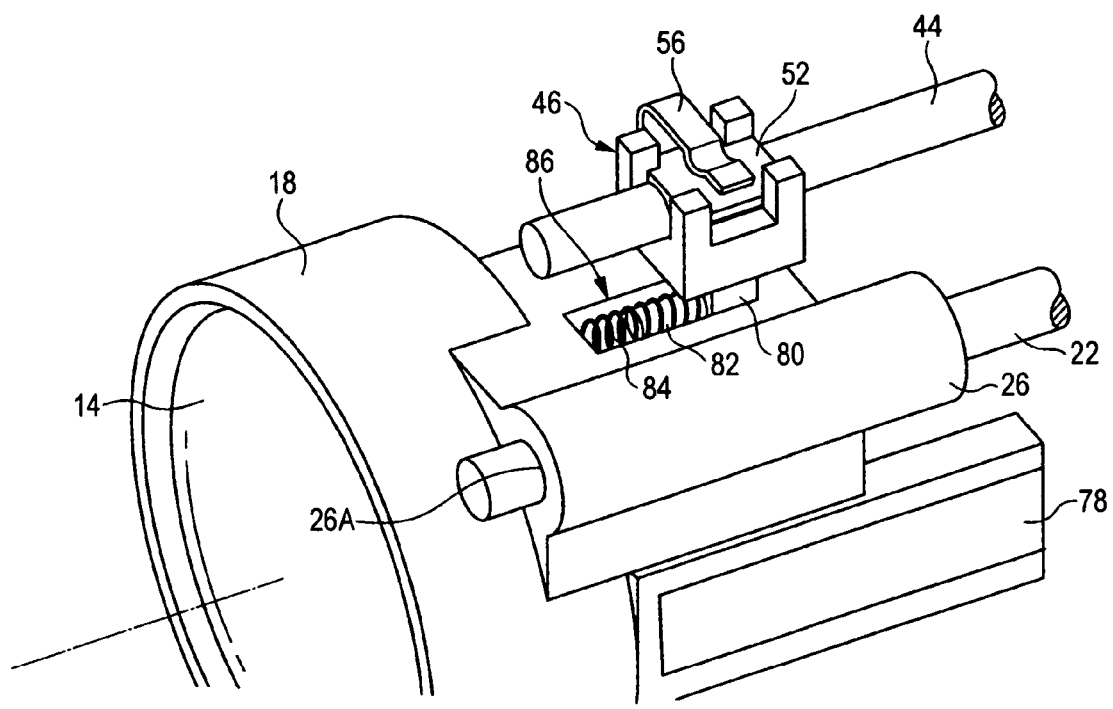
FIG. 6 is a perspective view illustrating an engagement part between the connection piece and a lens frame.
Figure 7:
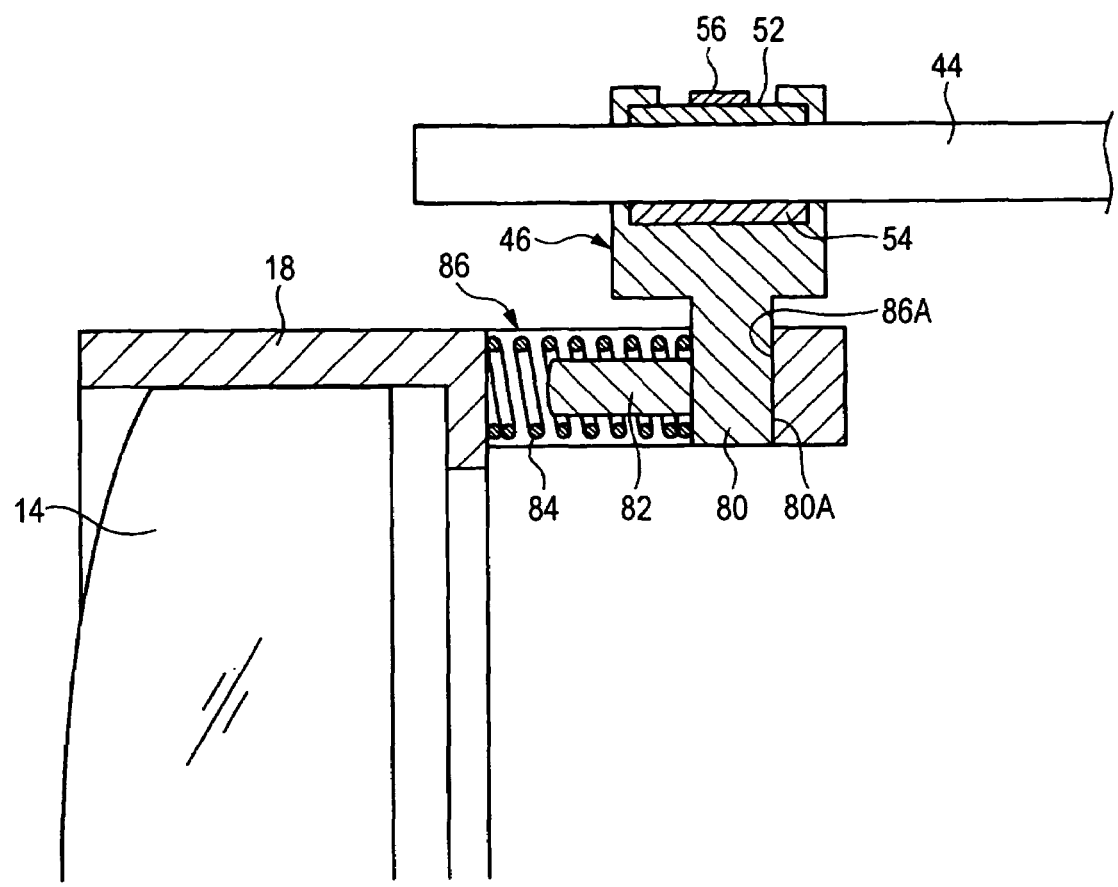
FIG. 7 is a cross-sectional view illustrating the engagement part between the connection piece and the lens frame.

The connection piece 46 is engaged with the above holding frame 18. That is, as shown in FIGS. 6 and 7, a guide portion 80 is formed on the bottom surface of the connection piece 46 to downwardly protrude therefrom. A reference surface 80A is formed on a side surface of the guide portion 80. Also, a circular-cylinder-like spring holding portion 82 is formed on a side surface opposite to the reference surface 80A. A helical spring 84 is fitted onto and is held by the spring holding portion 82.

Meanwhile, a hollow portion 86 opened in an up-down direction (that is, a direction perpendicular to the optical axis P) is formed in the holding frame 18. A reference surface 86A is formed at an end part of the hollow portion 86. The connection piece 46 is inserted into the hollow portion 86 of the holding frame 18 in a state in which the spring 84 is held by the spring holding portion 82. Consequently, the guide portion 80 is pushed by the spring 84 and is maintained in a state in which the reference surface 80A of the guide portion 80 abuts against the reference surface 86A of the holding frame 18. Thus, the connection piece 80A is engaged with the holding frame 18 in a state in which the connection piece 80A is positioned thereat. Consequently, the driven member including the connection piece 46, the holding frame 18, and the zoom lenses (or zoom lens groups) 14 is moved as one unit.

Figure 8A:
FIGS. 8A and 8B are charts illustrating examples of a driving pulse of a voltage applied to a piezoelectric element.
Figure 8B:
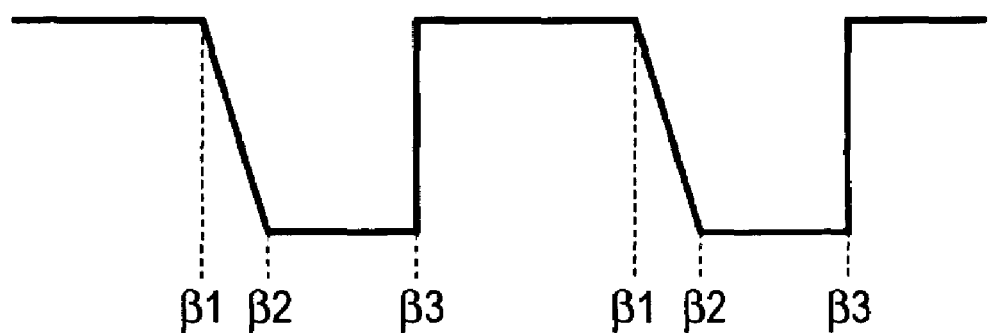

Voltages represented by driving pulses respectively shown in FIGS. 8A and 8B are applied to the above piezoelectric element 42. FIG. 8A shows a driving pulse applied thereto when the connection piece 46 shown in FIG. 4 is leftwardly moved. FIG. 8B shows a driving pulse applied thereto when the connection piece 46 shown in FIG. 4 is rightwardly moved.

In the case of the driving pulse shown in FIG. 8A, a voltage represented by the substantially sawtooth-like driving pulse, which slowly rises in a time period from a moment $\alpha 1$ to a moment $\alpha 2$ and rapidly falls at a moment $\alpha 3$, is applied to the piezoelectric element 42. Thus, in the time period from a moment $\alpha 1$ to a moment $\alpha 2$, the piezoelectric element 42 slowly extends. In this time period, the driving shaft 44 slowly moves together with the connection piece 46. Consequently, the connection piece 46 shown in FIG. 4 can leftwardly be moved. Because the piezoelectric element 42 rapidly shrinks at the moment $\alpha 3$, the driving shaft 44 rightwardly moves. At that time, the driving shaft 44 rapidly moves, so that the connection piece 46 remains stop at that position by inertia, and that only the driving shaft 44 moves. Accordingly, the connection piece 46 shown in FIG. 4 repeats the leftward movement and the stoppage by iteratively applying the sawtooth-like driving pulse shown in FIG. 8A to the piezoelectric element 42. Thus, the connection piece 46 can leftwardly be moved.

In the case of the driving pulse shown in FIG. 8B, a voltage represented by the substantially sawtooth-like driving pulse, which slowly falls in a time period from a moment $\beta 1$ to a moment $\beta 2$ and rapidly rises at a moment $\beta 3$, is applied to the piezoelectric element 42. Thus, in the time period from a moment $\beta 1$ to a moment $\beta 2$, the piezoelectric element 42 slowly shrinks. In this time period, the driving shaft 44 slowly displaces together with the connection piece 46. Consequently, the connection piece 46 shown in FIG. 4 can rightwardly be moved. Because the piezoelectric element 42 rapidly extends at the moment $\beta 3$, the driving shaft 44 leftwardly moves. At that time, the driving shaft 44 rapidly moves, so that the connection piece 46 remains stop at that position by inertia, and that only the driving shaft 44 moves. Accordingly, the connection piece 46 shown in FIG. 4 repeats the rightward movement and the stoppage by iteratively applying the sawtooth-like driving pulse shown in FIG. 8B to the piezoelectric element 42. Thus, the connection piece 46 can rightwardly be moved.

Next, an operation of the lens device 10 of the above configuration is described below. The holding frame 18 for the zoom lens (or lens group) 14 is supported by the two guide shafts 22 and 24 to be slidable in the direction of the optical axis P. That is, the holding frame 18 is slidably supported by the guide shaft 22 serving as the main guide means, and is prevented by the guide shaft 24, which serves as the auxiliary guide means, from turning. Similarly, the holding frame 20 for the zoom lens (or lens group) 16 is slidably supported by the guide shaft 24 serving as the main guide means, and is prevented by the guide shaft 22, which serves as the auxiliary guide means, from turning.

Thus, the holding frames 18 and 20 are slidably supported by the two guide shafts 22 and 24. Therefore, it is unnecessary that the loads of the holding frames 18 and 20 are supported by the guide shafts 44, 44 of the actuators 34 and 36. Consequently, the load imposed on the guide shaft 44 is small. Thus, there is no fear that the guide shaft 44 is damaged when receiving an impact caused by dropping the lens device 10. Also, an occurrence of a malfunction of each of the actuators 34 and 36 can be prevented.

Especially, according to the present embodiment, the driven member is divided into the holding frame 18 and the connection piece 46. The holding frame 18 and the connection piece 46 are engaged with each other by the pushing force of the spring 84. Thus, the engagement between the holding frame 18 and the connection piece is canceled against the pushing force when receiving the impact due to the dropping of the lens device. Consequently, there is no fear that the received impact is transmitted to the driving shaft 44 without change. Accordingly, the driving shaft can more effectively be prevented from being damaged.

According to the present embodiment, the driven member is supported by the guide shafts 22 and 24. Thus, the driving shaft 44 does not need to support the load due to the driven member. Consequently, the weight of the driving shaft 44 can be reduced by thinning the driving shaft 44. Thus, the responsibility of the driving shaft 44 at the application of the voltage to the piezoelectric element 42 is enhanced. Accordingly, the driven member can be moved with high precision.

Also, the present embodiment is adapted so that the holding frame 18 is supported by the guide shaft 22 serving as the main guide, and is engaged with the guide shaft 24 serving as the auxiliary guide, and that the holding frame 20 is supported by the guide shaft 24 serving as the main guide, and is engaged with the guide shaft 22 serving as the auxiliary guide. Therefore, according to the present embodiment, the holding frames 18 and 20 are evenly supported by utilizing the two guide shafts 22 and 24. Thus, the lens device 10 can be miniaturized.

Incidentally, the actuator according to the invention can be applied to, for example, miniature precision devices, such as a digital camera and a portable telephone. Especially, the portable telephone needs to be driven at a low voltage that is equal to or less than 3V. However, the portable telephone can be driven at a high frequency, which ranges from 40 kHz to 70 kHz, by using the actuator according to the invention, so that the holding frame 20 can be moved at a high speed that is equal to or higher than 2 mm/s. Thus, even the zoom lens required to move 10 mm or so can quickly be moved. The intended use of the actuator according to the invention is not limited to the movement of the moving lens, such as a focusing lens or a zoom lens. The actuator according to the invention may be used for moving a CCD.

The material of the weight member 58 according to the invention is not limited to the above soft material. A hard material may be used as the material of the weight member 58. However, the use of the soft material is preferable in the following respects. That is, when the weight member 58 made of a soft material is used, the resonance frequency of a system including the piezoelectric element 42, the driving frictional member 44, and the weight member 58 is reduced. The reduction in the resonance frequency alleviates the influence of variation in the constitution of the system including the piezoelectric element 42, the driving frictional member 44, and the weight member 58. Thus, a stable driving force can be obtained. Also, the reduction in the resonance frequency $f_0$ facilitates the setting of a drive frequency f in a vibration insulation region in which the resonance frequency $f_0$ and the drive frequency f meet the following condition: $f \geq 2^{1/2} \cdot f_0$. Thus, the influence of the resonance is reduced, so that a stable driving force can be obtained. Consequently, a driving force due to the extension/contraction of the piezoelectric element 42 is surely transmitted to the driven member. Accordingly, the driven member can accurately be moved in a direction in which the piezoelectric element 42 extends or contracts. Also, the resonance frequency $f_0$ is reduced to alleviate the influence of the resonance. Thus, an actuator supporting position and a method of supporting the actuator can optionally be selected. The actuator can be supported by, for example, the end surface 42A or a side surface of the piezoelectric element 42 or a side surface or an end surface of the driving shaft 44.

According to the invention, the driven member is guided in the direction of the optical axis by providing a plurality of guides in the lens device. Thus, the load due to the driven member can be prevented from being applied to the driving frictional member. Consequently, the driving frictional member can be prevented from being damaged when receiving the impact due to the dropping of the camera. Also, occurrences of the displacement and the inclination thereof due to a posture difference can be prevented.

The entire disclosure of each and every foreign patent application from which the benefit of foreign priority has been claimed in the present application is incorporated herein by reference, as if fully set forth.

What is claimed is:

1. A lens device comprising:
   at least one driven member including an optical system and a lens frame holding the optical system;
   a plurality of guides that guide the driven member in a direction of an optical axis;
   a driving frictional member frictionally engaged with the driven member; and
   an electro-mechanical conversion member connected to the driving frictional member, wherein said electro-mechanical conversion member is a piezoelectric element, and wherein a weight member is fixed to an end surface of said piezoelectric element, and a weight of said weight member is larger than a weight of said driving frictional member,
   wherein
   under a first force condition, the driving frictional member moves in conjunction with the driven member, and
   under a second force condition, the driving frictional member moves relative to the driven member along the optical axis direction.

2. The lens device according to claim 1,
wherein the driven member comprises a connection member frictionally engaged with the driving frictional member; and
the connection member is connected to the lens frame through an elastic element.

3. The lens device according to claim 1,
wherein said at least one driven member comprises a plurality of driven members, and
said plurality of the driven members are guided by a common guide.

4. The lens device according to claim 1, wherein
the driven member comprises a connection member frictionally engaged with the driving frictional member, and
a first sliding member and a second sliding member are provided at an engagement portion between said connection member and said driving frictional member, said first sliding member being disposed on a first side of said driving frictional member, and said second sliding member being disposed on a second side of said driving frictional member.

5. The lens device according to claim 4, wherein said driving frictional member is clamped between said first sliding member and said second sliding member, so that said connection member is frictionally-engaged with said driving frictional member.

6. The lens device according to claim 1, wherein
said electro-mechanical conversion member is a piezoelectric element,
a frictional force acting between said driven member and said driving frictional member is larger in magnitude than a driving force when a driving pulse representing a slowly changing voltage is applied to said piezoelectric element, and
a frictional force acting between said driven member and said driving frictional member is smaller in magnitude than a driving force when a driving pulse representing a rapidly changing voltage is applied to said piezoelectric element.

7. The lens device according to claim 1, wherein said driven member is slidably supported by a guide of said plurality of guides, and is prevented from turning by another guide of said plurality of guides.

8. The lens device according to claim 1, wherein a weight member is attached to an end surface of said electro-mechanical conversion member, said weight member being made of a material such that a resonance frequency of a system including said electro-mechanical mechanical conversion member, said diving frictional member, and said weight member, is reduced.

9. The lens device according to claim 1, wherein a resonance frequency $f_0$ of a system including said electro-mechanical conversion member and said driving frictional member is reduced, to facilitate a drive frequency f in a vibration insulation region in which said resonance frequency $f_0$ and said drive frequency f meet a condition $f \geq 2^{1/2} \cdot f_0$.

* * * * *